US009009853B2

(12) United States Patent
Korycki et al.

(10) Patent No.: US 9,009,853 B2
(45) Date of Patent: Apr. 14, 2015

(54) COMMUNICATION BETWEEN WEB APPLICATIONS

(75) Inventors: Jacek Korycki, San Jose, CA (US); Alok Khanna, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 13/414,230

(22) Filed: Mar. 7, 2012

(65) Prior Publication Data

US 2013/0239231 A1    Sep. 12, 2013

(51) Int. Cl.
*G06F 7/04*     (2006.01)
*H04L 29/08*    (2006.01)

(52) U.S. Cl.
CPC ............... *H04L 67/02* (2013.01); *H04L 67/34* (2013.01)

(58) Field of Classification Search
CPC ................................. G06F 21/24; G06F 15/16
USPC .......................................................... 726/29
See application file for complete search history.

(56) References Cited

U.S. PATENT DOCUMENTS

| | | | | |
|---|---|---|---|---|
| 7,945,774 | B2 * | 5/2011 | Ganesan ........................ | 713/151 |
| 8,291,475 | B2 * | 10/2012 | Jackson et al. ..................... | 726/4 |
| 2009/0265760 | A1 | 10/2009 | Zhu et al. | |
| 2010/0180330 | A1 | 7/2010 | Zhu et al. | |
| 2010/0257242 | A1 * | 10/2010 | Morris .......................... | 709/206 |
| 2010/0318619 | A1 | 12/2010 | Meijer | |

OTHER PUBLICATIONS

"Client-Side Secure Mashups", retrieved from http://publib.boulder.ibm.com/infocenter/wsmashin/v1r0/index.jsp?topic=/com.ibm.websphere.sMash.doc/core/openajax.hub/docs/en/ClientsideSecureMashup.html on Mar. 6, 2012, 4 pages.
Adams, "Mashup Business Scenarios and Patterns: Part 2", retrieved from http://www.ibm.com/developerworks/lotus/library/mashups-patterns-pt2/ on Mar. 6, 2012, Feb. 3, 2009, 12 pages.
Heileman, et al., "SMASHUP: Secure Mashup for Defense Transformation and Net-Centric Systems", Proc. SPIE 8062, 806206 (2011); retrieved from http://www.modusoperandi.com/downloads/SMASHUP%20Secure%20Mashup%20for%20Defense%20Transformation%20and%20NetCentric%20Systems.pdf on Mar. 6, 2012, Apr. 27, 2011, 15 pages.
Jackson, et al., "Subspace: Secure Cross-Domain Communication for Web Mashups", WWW '07 Proceedings of the 16th international conference on World Wide Web, May 8, 2007, pp. 611-620.

* cited by examiner

*Primary Examiner* — Beemnet Dada
(74) *Attorney, Agent, or Firm* — Sonia Cooper; Jim Ross; Micky Minhas

(57) ABSTRACT

In an embodiment, communication is controlled between a service provider web application executed in a first web browser instance on a device platform of the device and a partner web application executed in a second web browser instance on the device platform. A signal is received, at a control module at the device, from the partner web application, the signal for initiating communication between the partner web application and the service provider web application. The control module, provided by the service provider and installed on the device, uses technology that is native to the device platform. The control module uses a list of partners approved by the service provider to determine whether the partner web application is approved for communication with the service provider web application. If the control module determines the partner web application is approved, the control module allows communication to proceed.

23 Claims, 3 Drawing Sheets

COMMUNICATION BETWEEN WEB APPLICATIONS

TECHNICAL FIELD

The present invention relates to communication between web applications executed on a device.

BACKGROUND

Web applications can be downloaded to a device over the Internet and then executed in a web browser instance implemented on a device platform of the device. The device may, for example, be a PC, laptop, mobile phone or any other suitable device which is capable of connecting to the Internet. Web applications are executed at the device using a web-based technology (e.g. in accordance with the HTML 5 standard). A web browser instance may refer to any separate interface of a web browser with which a user can interact, such as a window, tab or frame of a web browser or to instances of different web browsers from different vendors such as Microsoft Internet Explorer and Mozilla Firefox.

A service provider can provide a service for a user of a device by providing a service provider client application for execution on the device. The service provider client application includes web components (e.g. a web application) which execute in a web browser instance at the device, both as pure web components (e.g. implemented as HTML, Javascript and CSS artifacts dynamically downloaded from a web server), and includes installed (native) components deployed at the device in the form of browser plugins and other installed software that augments the pure web components of the service provider client application.

Similarly, a partner web application from another entity may be provided for execution in a web browser instance on the same device, wherein the partner web application may comprise web components with or without native enhancements. The other entity from which the partner web application is provided may be a partner of the service provider and may be trusted by the service provider, in which case it may be useful for the service provider web application to be able to communicate with the partner web application on the device. However, in other situations, the other entity from which a partner web application is provided might not be trusted by the service provider, in which case it might be useful to prevent communication between the service provider web application and the partner web application on the device.

A "mash-up" occurs when the service provider web components and the partner web components exchange signaling at the device thereby conveying some useful data between the service provider web application and the partner web application. Mash-ups can be particularly beneficial since they provide the user of the device with a combination of information that may be absent in both the service provider web application and the partner web application if they were to execute separately. Particular benefit in mash-ups manifests itself when web applications are combined in creative ways. In order to implement mash-ups (and thereby achieve the benefits associated therewith), cross-provider signaling is a necessary facility that enables communication between web applications executing simultaneously on the device. It is therefore beneficial to be able to allow the service provider web application to conduct secure client-side (i.e. implemented at the device) signaling with a partner web application.

SUMMARY

According to a first aspect of the invention there is provided a method of controlling communication between a service provider web application executed in a first web browser instance implemented on a device platform of a device and a partner web application executed in a second web browser instance implemented on the device platform of the device, the method comprising: receiving, at a control module implemented at the device, a signal from the partner web application for initiating communication between the partner web application and the service provider web application, said control module being provided by the service provider and installed on the device and being implemented using technology that is native to the device platform; using a list of partners approved by the service provider, the control module determining whether the partner web application is approved for communication with the service provider web application; and if the control module determines that the partner web application is approved for communication with the service provider web application, the control module allowing communication to proceed between the partner web application and the service provider web application.

Advantageously the control module determines whether the partner web application is approved for communication with the service provider web application before allowing the communication between the partner web application and the service provider web application to proceed. In this way, in preferred embodiments, the control module assures a managed environment where only desired partner web applications are allowed to communicate with the service provider web application. Any other web application (other than those on the list of partners approved by the service provider) may be prevented from participating in communication with the service provider web application.

Preferred embodiments provide a communication (or "signaling") facility between the service provider web application and web applications of partners of the service provider that has fewer constraints than in the prior art.

The method may further comprise: if the control module determines that the partner web application is not approved for communication with the service provider web application, the control module preventing communication between the partner web application and the service provider web application.

Preferably, a respective browser plugin is implemented for each of the first and second web browser instances, wherein each browser plugin is implemented for communicating between the respective web browser instance and the control module.

Preferably, the service provider web application and the partner web application implement respective application programming interfaces for communicating with each other via the control module. The application programming interfaces may be downloaded from a server of the service provider.

The list of partners approved by the service provider may be stored at a server of the service provider, and the step of using the list of partners approved by the service provider may comprise the control module communicating with the server of the service provider over a network to access the list of partners approved by the service provider. Alternatively, or additionally, the list of partners approved by the service provider may be downloaded from a server of the service provider and stored in a memory of the device, and the step of using the list of partners approved by the service provider may comprise the control module accessing the list of partners approved by the service provider from the memory of the device.

In preferred embodiments, the communication between the service provider web application and the partner web application proceeds using a publish-subscribe signaling scheme. The signal received at the control module from the partner web application may be a subscribe request or a publish request of the publish-subscribe signaling scheme.

The first and second web browser instances may be implemented with web browsers from different vendors. Furthermore, the first and second web browser instances might not have a parent-child relationship.

The determining whether the partner web application is approved for communication with the service provider web application may comprise comparing a domain associated with the partner web application with the entries of the list of partners approved by the service provider.

The service provider may be an Internet communication service provider and the method may further comprise the partner web application communicating over the internet using the communication between the partner web application and the service provider web application.

According to a second aspect of the invention there is provided a computer program product for controlling communication between a service provider web application executed in a first web browser instance implemented on a device platform of the device, the computer program product being embodied on a computer-readable medium and configured so as when executed on a processor of the device to implement a control module at the device for performing the operations of: receiving a signal from the partner web application for initiating communication between the partner web application and the service provider web application, said control module being provided by the service provider and installed on the device and being implemented using technology that is native to the device platform; using a list of partners approved by the service provider to determine whether the partner web application is approved for communication with the service provider web application; and if the control module determines that the partner web application is approved for communication with the service provider web application, allowing communication to proceed between the partner web application and the service provider web application.

According to a third aspect of the invention there is provided a device configured to control communication between a service provider web application executed in a first web browser instance implemented on a device platform of the device and a partner web application executed in a second web browser instance implemented on the device platform of the device, the device being configured to implement a control module to: receive a signal from the partner web application for initiating communication between the partner web application and the service provider web application, said control module being provided by the service provider and installed on the device and being implemented using technology that is native to the device platform; use a list of partners approved by the service provider, to determine whether the partner web application is approved for communication with the service provider web application; and allow communication to proceed between the partner web application and the service provider web application if the control module determines that the partner web application is approved for communication with the service provider web application.

The device may be further configured to implement the control module to prevent communication between the partner web application and the service provider web application if the control module determines that the partner web application is not approved for communication with the service provider web application.

The device may be further configured to implement a respective browser plugin for each of the first and second web browser instances, wherein each browser plugin may be configured to communicate between the respective web browser instance and the control module.

The device may be further configured to implement respective application programming interfaces in the service provider web application and the partner web application for communication between the service provider web application and the partner web application via the control module.

The device may further comprise a memory configured to store the list of partners approved by the service provider, wherein the device may be further configured to download the list of partners approved by the service provider from a server of the service provider and store said list in the memory of the device.

According to a fourth aspect of the invention there is provided a system comprising: a device configured to execute a service provider web application in a first web browser instance implemented on a device platform of the device and to execute a partner web application in a second web browser instance implemented on the device platform of the device; and a server of the service provider comprising a memory for storing a list of partners approved by the service provider, wherein the device is configured to implement a control module to: receive a signal from the partner web application for initiating communication between the partner web application and the service provider web application, said control module being provided by the service provider and installed on the device and being implemented using technology that is native to the device platform; access the list of partners approved by the service provider by communicating with the server of the service provider over a network, to thereby determine whether the partner web application is approved for communication with the service provider web application; and allow communication to proceed between the partner web application and the service provider web application if the control module determines that the partner web application is approved for communication with the service provider web application.

The service provider web application and the control module may be parts of a hybrid service provider client application downloaded to the device from a server of the service provider.

BRIEF DESCRIPTION OF THE DRAWINGS

For a better understanding of the present invention and to show how the same may be put into effect, reference will now be made, by way of example, to the following drawings in which.

DETAILED DESCRIPTION

In some prior art systems, web mash-up allowing web applications to communicate with each other focuses on pure web solutions, not supported by any installed components at the device implemented using a technology that is native to the device platform of the device (e.g. C++). An example of such a prior art system is an Open Ajax Hub, designed by the Open Ajax Alliance. Although web browsers in general preclude interactions between web applications sourced from different Internet domains (i.e. "cross-domain" interactions) due to security reasons, the Open Ajax Hub system enables a controlled signaling between web applications sourced from different Internet domains. In order to achieve this, the Open Ajax Hub employs so called URL-fragment messaging to facilitate data transfers across domains.

The Open Ajax hub system relies on certain relationships between the web browser instances that host the cross-domain web applications in order for the cross-domain web applications to be able to communicate with each other:

(i) the web browser instances must come from the same web browser type (e.g. the same vendor), such as Microsoft Internet Explorer or Mozilla Firefox;

(ii) the web browser instances (e.g. frames) must have a parent-child relationship, either by: (a) one web browser instance being embedded in another web browser instance e.g. using the iFrame tag, or (ii) one web browser instance being a pop-up child window, spawned by the parent web browser instance.

Therefore, in the Open Ajax hub system constraints are placed on the web instances which may be used in order for the web mash-up to be implemented successfully.

Preferred embodiments of the invention will now be described, by way of example only, which remove constraints with the Open Ajax hub system, while maintaining the security of the communication between web applications, that is, while managing which web applications (e.g. sourced from which domains) can communicate with each other.

Figure 1:
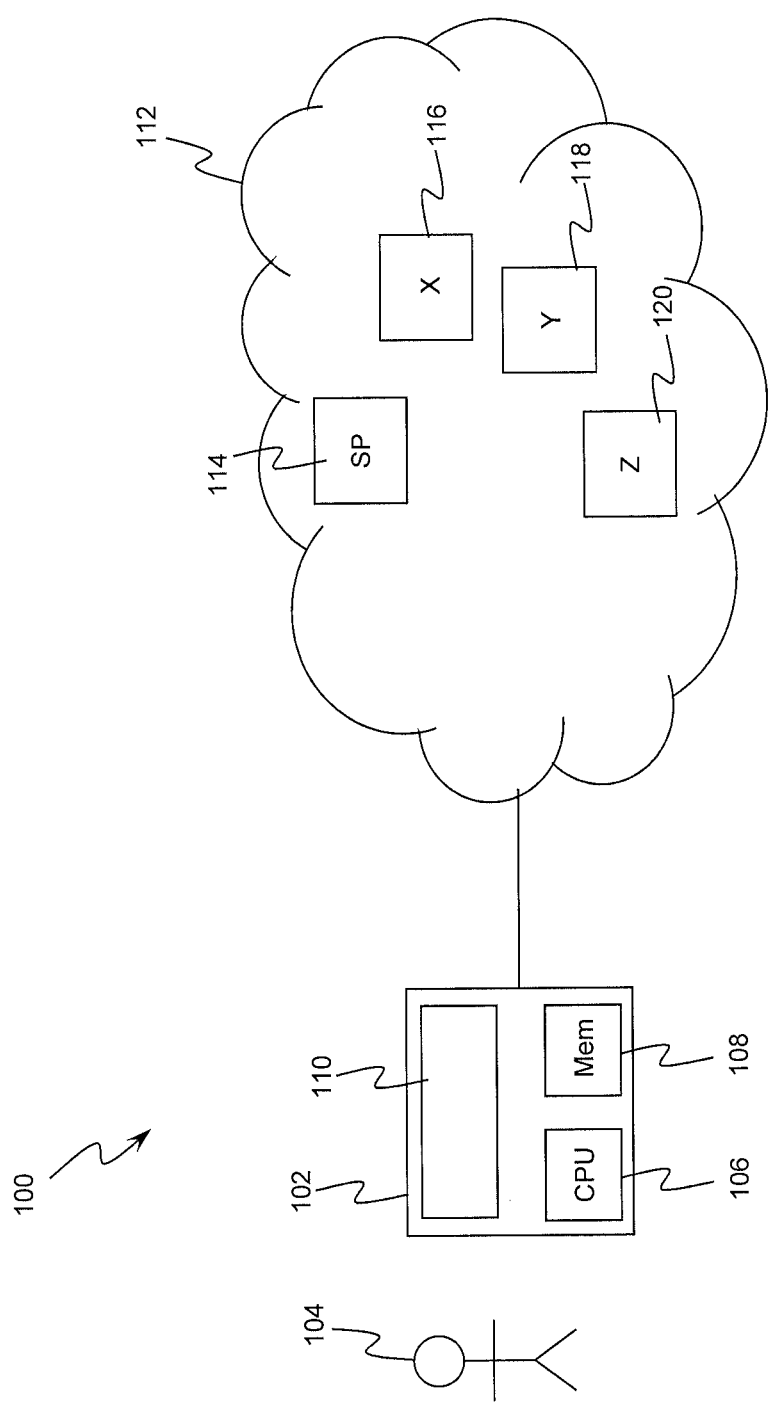
FIG. 1 shows a communication system according to a preferred embodiment.

FIG. 1 shows a system 100 according to a preferred embodiment in which a device 102 operates. The device 102 is capable of communicating over a network 112 of the system 100. The device 102 is associated with a user 104 and comprises a processor (CPU) 106 for processing data on the device 102 and a memory 108 for storing data on the device 102. The device 102 may be a fixed or a mobile device. The device 102 may be, for example, a mobile phone, a personal digital assistant ("PDA"), a personal computer ("PC") (including, for example, Windows™, Mac OS™ and Linux™ PCs), a laptop, a television, a gaming device or other embedded device able to connect to the network 112. The device 102 is arranged to receive information from and output information to the user 104. For example, the device 102 includes a display 110 for outputting visual data to the user 104. The display 110 may include a touch-sensitive screen allowing the user 104 to input data to the CPU 106 via the display 110. The device 102 may include further components providing a user interface with the user 104 which are not shown in FIG. 1. For example the device 102 may include a microphone for receiving audio signals; audio output means 210 for outputting audio signals; and/or a keyboard, keypad, joystick or mouse for receiving an input from the user 104. The device 102 implements a device platform on which applications can be executed. For example the device platform may be adapted to be suited to a mobile device or to be suited to a fixed device. The device platform describes the environment in which applications are implemented at the device 102 and may include: (i) an operating system implemented on the device 102, and/or (ii) a particular type of device, e.g. a mobile device having a small screen or a fixed device having a large screen.

In the preferred embodiments described herein the network 112 is the Internet. As shown in FIG. 1, the system 100 includes four servers on the network 112: a server SP 114 operated by a service provider, server X 116, server Y 118 and server Z 120. The system 100 is arranged so that the device 102 can communicate with the servers 114, 116, 118 and 120 over the network 112, such that data can be transmitted between the device 102 and the servers 114, 116, 118 and 120. As an example, the service provider server 114 has a web address (i.e. a domain name) of "sp.com", the server 116 has a web address (i.e. a domain name) of "x.com", the server 118 has a web address (i.e. a domain name) of "y.com" and the server 120 has a web address (i.e. a domain name) of "z.com". In the preferred embodiments described herein the service provider server 114 can provide a service provider client application for installation on the device 102 which includes web components referred to herein as a service provider web application, whereas the servers 116, 118 and 120 are web servers allowing the device 102 to download web applications for execution in web browser instances at the device 102. For example the web applications may be web pages downloaded over the network 112 for display on the display 110 of the device 102. The service provider client application is downloaded from the service provider server 114 (at "sp.com") to the device 102.

The preferred embodiments described herein relate to controlling communication between the service provider web application and other web applications executing at the device 102.

Figure 2:
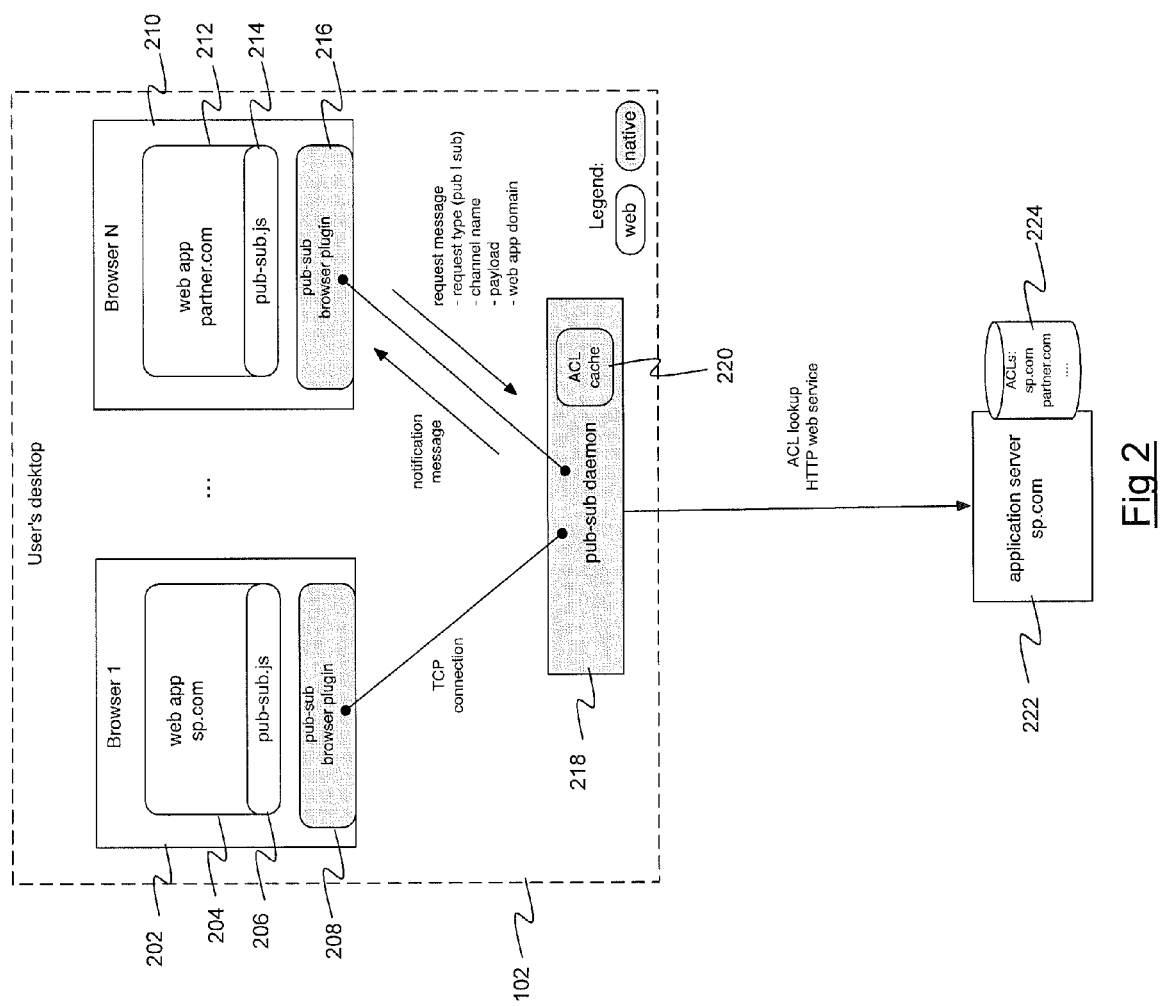
FIG. 2 shows a schematic view of a device and a service provider server according to a preferred embodiment.

FIG. 2 is a schematic view of the device 102 and a service provider server 222 according to a preferred embodiment. The service provider server 222 may be the same server as the service provider server 114 from which the service provider client application is downloaded to the device 102. However, the service provider may have more than one server, and the server 222 may be a different server to server 114, although in that case both servers 222 and 114 are operated by the service provider. The service provider may provide any suitable service to the user 104 of the device 102. For example, the service provider may provide an Internet communication service (such as Skype™) to the user 104 of the device 102, thereby allowing the user 104 to engage in communication with other users of the Skype™ system over the Internet 112.

As shown in FIG. 2, a first web browser instance 202 and a second web browser instance 210 are implemented on a device platform of the device 102. As described above the web browser instances 202 and 210 may be separate interfaces of a web browser with which a user can interact, such as a window, tab or frame of a web browser or the web browser instances 202 and 210 may be instances of different web browsers from different vendors such as Microsoft Internet Explorer and Mozilla Firefox. The service provider web application 204 (which is part of the service provider client application) is executed in the first web browser instance 202. The service provider web application 204 includes a widget 206 which is a Javascript Application Programming Interface (API). The widget 206 allows the service provider web application 204 to communicate using the publish-subscribe signaling scheme. A publish-subscribe browser plugin 208 is implemented in the first web browser instance 202, as described in more detail below. A web application 212 provided by a partner of the service provider is executed in the second web browser instance 210. The partner web application 212 includes a widget 214 which is a Javascript Application Programming Interface (API). The widget 214 allows the partner web application 212 to communicate using the publish-subscribe signaling scheme. A publish-subscribe browser plugin 216 is implemented in the second web browser instance 210, as described in more detail below.

A control module 218, referred to herein as a publish-subscribe daemon application, is implemented at the device 102. The publish-subscribe daemon application 218 is part of the service provider client application downloaded from the service provider server 114. The publish-subscribe daemon application 218 includes a memory 220, e.g. a cache memory. The cache memory 220 may, or may not, be a part of the main memory 108 of the device 102.

The server 222, which resides on the network 112, is hosted by the service provider and includes a memory for storing a database 224. The database 224 includes a list of domains which are trusted by the service provider, and which is maintained and kept up-to-date by the service provider. If a domain of a partner of the service provider is trusted by the service provider then communication is allowed to proceed between the service provider web application 204 and the partner web application 212 at the device 102 (i.e. client-side signaling is allowed to occur). Indications of the trusted partners of the service provider are stored in the database 224 as an Access Control List (ACL) defining which partners are allowed for mash-up with the service provider web application 204 at the device 102.

As shown in FIG. 2, the publish-subscribe daemon application 218 and the publish-subscribe browser plugins 208 and 216 are implemented using a native technology, that is, a technology that is native to the device platform of the device 102 (e.g. C++). The publish-subscribe daemon application 218 is a native part of the service provider client application and is always running in the background at the device 102 when the service provider client application has been downloaded to, and is implemented at, the device 102. In contrast, the web browser instances 202 and 210, the web applications 204 and 212, the widgets 206 and 214 and the service provider server 222 are implemented using web-based technology (e.g. in accordance with the HTML 5 standard).

Signals can be transmitted between the publish-subscribe daemon application 218 and the publish-subscribe browser plugin 208 and between the publish-subscribe daemon application 218 and the publish-subscribe browser plugin 216 using the publish-subscribe signaling scheme. This may be achieved by establishing respective Transport Control Protocol (TCP) connections between the publish-subscribe daemon application 218 and the publish-subscribe browser plugin 208 and between the publish-subscribe daemon application 218 and the publish-subscribe browser plugin 216. The publish-subscribe browser plugins 208 and 216 provide bridges between the respective web applications 204 and 212 and the publish-subscribe daemon application 218. The publish-subscribe daemon application 218 is also arranged to communicate with the service provider server 222 over the Internet 112.

Preferred embodiments provide a secure client-side signaling facility between the service provider web application 204 and the separate partner web application 212. The publish-subscribe model is used to frame the signaling between the web applications. Publish-subscribe signaling is known to a person skilled in the art. In a publish-subscribe signaling scheme, web applications can communicate with each other using the following two operations provided to them by the publish-subscribe service:

(i) a publish operation, which has two parameters: channel name and data payload; and (i) a subscribe operation, which has two parameters: channel name and notification function.

When a publisher invokes the publish operation, the publish-subscribe service broadcasts the associated data payload to all subscribers of the indicated channel, by invoking their notification functions. There is also an unsubscribe operation, which is complementary to the subscribe operation. Given a simple and general facility like the publish-subscribe signaling scheme one can build arbitrary signaling on top of it. An example of some Javascript code illustrating the details of the API and an example usage of the publish-subscribe signaling scheme is provided below:
scheme is provided below:

```
var pubsub = {
        publish : function( channel, data) {
                // implementation...
        },
        subscribe : function( channel, notificationFuntion) {
                // implementation ...
                return subscriptionId;
        },
        unsubscribe: function( channel, subscriptionId) {
                // implementation ...
        }
};
// example usage
var myNotificationFunction = function( data) {
        // do something useful with the data
};
var mySubscriptionId = pubsub.subscribe( "myChannel",
myNotificationFunction);
pubsub.publish( "myChannel", "hello world");
pubsub.unsubscribe( mySubscriptionId);
```

In the example code given above, the publish operation, the subscribe operation and the unsubscribe operation are defined in accordance with the description given above, and an example usage of the signaling scheme to "do something useful" with the data, "hello world", included in the publish operation on a channel called "myChannel" is provided, as would be apparent to a person skilled in the art.

Figure 3:
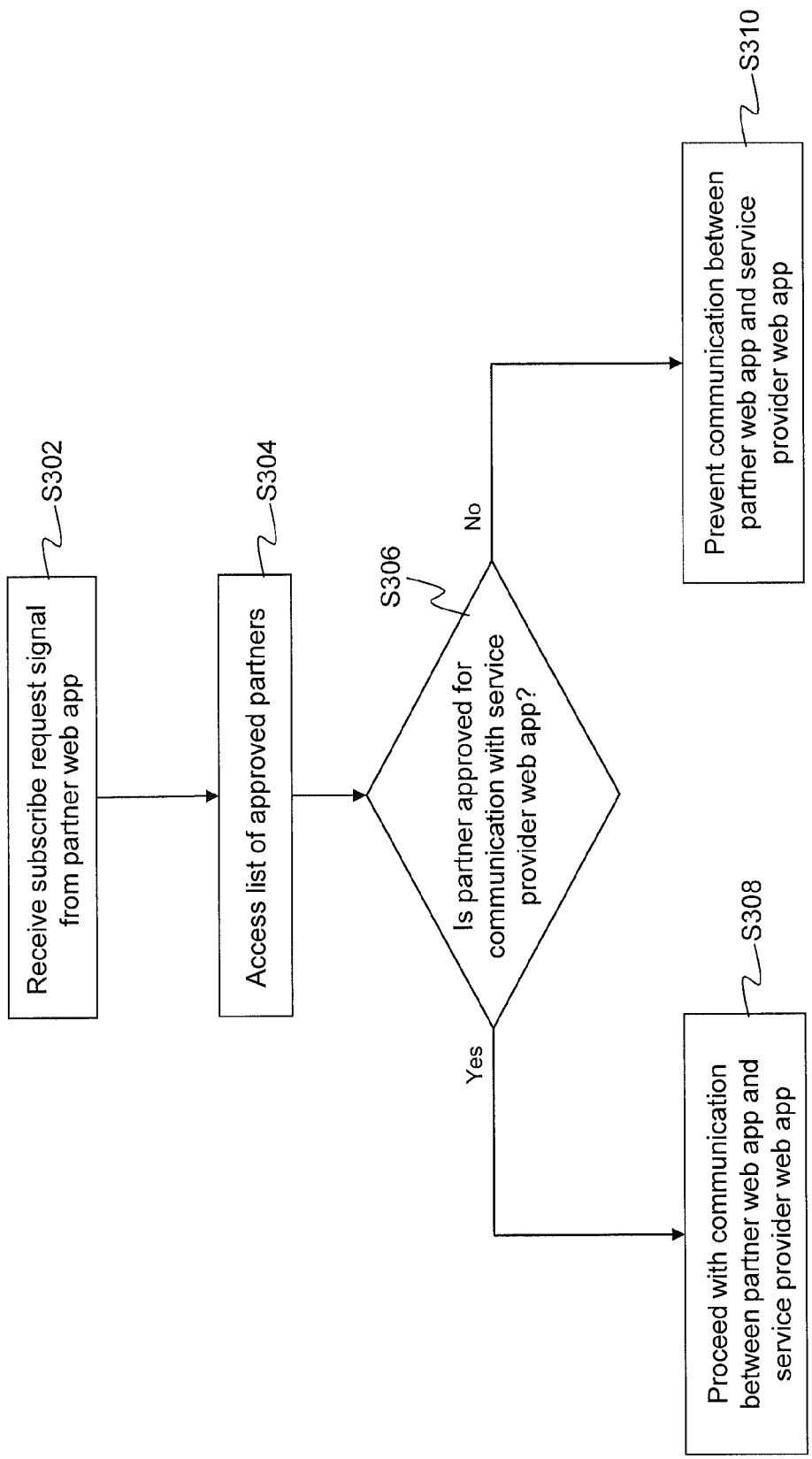
FIG. 3 is a flow chart for a process of controlling communication between a service provider web application and a partner web application according to a preferred embodiment.

With reference to the flow chart shown in FIG. 3 there is now described a preferred method for secure communication between the service provider web application 204 and the partner web application 212 using the publish-subscribe signaling scheme for implementing a web mash-up including the service provider web application 204 and the partner web application 212.

In step S302 the partner web application 212 invokes the subscribe operation of the publish-subscribe signaling scheme using the Javascript API 214 downloaded from the service provider server 114. The subscribe request is transmitted via the publish-subscribe browser plugin 216 to the publish-subscribe daemon application 218. As described above, the subscribe request will indicate that the request is a subscribe request (rather than a publish request or any other type of request) and will also indicate a channel name and a function to perform on data that may be received on the indicated channel. The function may, for example, be to send the published data to the partner web application 212 for display in the second web browser instance 210.

It is assumed that the user 104 has previously installed the native components of the service provider client application on the device 102, including the publish-subscribe daemon application 218 and the publish-subscribe browser plugins 208 and 216. The widget 214 is implemented as a publish-subscribe.js library and maintains a list of Javascript notification functions subscribed on a channel. Before the subscribe request is sent to the publish-subscribe daemon application 218, the widget 214 adds the notification function provided by the partner web application 212 in the subscribe request to the list of Javascript notification functions subscribed on the channel indicated in the subscribe request. Then, the widget 214 delegates the subscribe request to the native publish-subscribe browser plugin 216. It is noted that the publish-subscribe browser plugins 208 and 216 may include multiple versions for implementation on different types of web browser instances. For example, the publish-subscribe browser plugins 208 and 216 may have an ActiveX version for implementation on an instance of Internet Explorer, and a Netscape Plugin Application Programming Interface (NPAPI) version for implementation on an instance of a Mozilla type browser such as Firefox or Safari.

As described above, the publish-subscribe browser plugins 208 and 216 maintain respective TCP connections, using a socket API, with the publish-subscribe daemon application 218. If this is the first publish-subscribe request sent from the partner web application 212 to the publish-subscribe daemon application 218, then the publish-subscribe browser plugin 216 sets up the TCP connection to the publish-subscribe daemon application 218; otherwise the publish-subscribe browser plugin 216 uses the TCP connection that is already established between the publish-subscribe browser plugin 216 and the publish-subscribe daemon application 218. The publish-subscribe browser plugin 216 transmits the subscribe request message over the TCP connection to the publish-subscribe daemon application 218. Arbitrary serialization formats may be employed, including JavaScript Object Notation (JSON) or Extensible Markup Language (XML). The subscribe request message includes the publish-subscribe operation details (in the case of subscribe it means the operation type and the channel name), as provided by the partner web application 212 in the subscribe API call. In addition, the publish-subscribe browser plugin 216 detects the Internet domain of the web page loaded into the second web browser instance 210 whose Javascript is making the subscribe request. The publish-subscribe browser plugin 216 adds an indication of the domain to the subscribe request message.

In step S304, upon receiving the subscribe request message from the publish-subscribe browser plugin 216, the publish-subscribe daemon application 218 accesses the list (i.e. the ACL) of approved partners of the service provider from the database 224. This is done by communicating with the service provider server 222 over the Internet 112 to thereby implement a lookup of the ACL database 224 hosted on the service provider server 222. This can be done in many ways. One possible approach involves invoking a HTTP web service hosted on the service provider server 222 that is also deployed on the service provider backend, fronting the ACL database. To improve the performance of the system, the publish-subscribe daemon application 218 may temporarily store the results of the lookup of the ACL in the ACL cache 220, e.g. with some expiration time. In this way, if the publish-subscribe daemon application 218 needs to access the ACL again at some subsequent time, then step S304 can be performed by accessing the cache memory 220 on the device 102, rather than needing to access the database 224 on the service provider server 222. In this way the need to communicate over the Internet 112 is removed, or at least reduced, thereby allowing the method to be performed without the device 102 needing to communicate over the Internet 112, which is particularly beneficial when the device 102 is offline (in other words, when the device is not engaging in communication over the Internet 112).

When the ACL has been accessed, then in step S306 the publish-subscribe daemon application 218 determines whether the domain of the partner associated with the partner web application 212 (which was indicated in the subscribe request message) is present in the ACL, i.e. whether the service provider has approved the partner web application 212 for communication with the service provider web application 204. The determination performed in step S306 as to whether the partner web application 212 is approved is preferably performed by checking that the partner web application 212 is associated with an entry in the list of partners approved by the service provider, which may be stored in the database 224 or in the cache memory 220 associated with the publish-subscribe daemon application 218.

If it is determined in step S306 that the partner web application 212 is approved for communication with the service provider web application 204 then the method proceeds from step S306 to step S308. In step S308 the publish-subscribe daemon application 218 allows communication to proceed between the partner web application 212 and the service provider web application 204. The publish-subscribe daemon application 218 registers the TCP connection (using its socket representation) linking it with the subscribing browser plugin 216 in the list of TCP connections subscribed to the indicated channel. When the subscribing browser plugin 216 is in the list of TCP connections subscribed to the indicated channel and a publish request operation is implemented for the indicated channel, the data in the publish request operation will be sent to the subscribing browser plugin 216 for communication to the partner web application 212.

For example, another web application, such as the service provider web application 204 may invoke a publish request message on the same channel as the partner web application 212 has subscribed to. The publish request message is delivered to the publish-subscribe daemon application 218 in the same way as described above for the subscribe request message invoked by the partner web application 212. The publish request message may undergo a domain check corresponding to that performed for the subscribe request as described above. Where the publish request message has been invoked by the service provider web application 204, the publish-subscribe daemon application 218 may automatically determine that the service provider web application 204 is allowed to communicate without needing to check that the service provider is included in the ACL stored in the database 224 or in the cache memory 220. The domain of the service provider (e.g. "sp.com") may be automatically included in the ACL such that if the publish-subscribe daemon application 218 does perform a check of the ACL, it will determine that the service provider web application 204 is allowed to communicate with other web applications executed at the device 102.

If the publish-subscribe daemon application 218 has received a publish request and a subscribe request on the same channel from approved web applications it sends the publish message, in a serialized format, over each of the TCP connections to the allowed subscribing web applications. Each subscribed publish-subscribe browser plugin (e.g. publish-subscribe browser plugin 216) receives the publish message and delivers it to the publish-subscribe.js library provided by the widget (e.g. widget 214) in the respective web application (e.g. partner web application 212). The publish-subscribe.js library (e.g. widget 214) looks up the list of Javascript notification functions subscribed to the indicated channel and then calls each notification function on the list, including the publish data payload (from the publish message) as an argument. The notification is then processed by the code of the web application (e.g. web application 212).

If it is determined in step S306 that the partner web application 212 is not approved for communication with the service provider web application 204 then the method proceeds from step S306 to step S310. In step S310 the publish-subscribe daemon application 218 prevents communication from proceeding between the partner web application 212 and the service provider web application 204. This may be achieved by the publish-subscribe daemon application 218 ignoring the subscribe request message from the partner web application 212. In this way, a web application from an unapproved partner is not able to participate in publish-subscribe communication with the service provider web application 204, neither in the publisher nor subscriber role.

There is therefore described a secure client-side communication facility for allowing communication between the service provider web application 204 and an approved partner web application 212 (e.g. using a publish-subscribe signaling scheme) which prevents communication between the service provider web application 204 and unapproved partner web applications. This is achieved without placing constraints on the web browser instances 202 and 210, and may, for example, be used when the web browser instances 202 and 210 are implemented with web browsers from different vendors (e.g. Microsoft Internet Explorer and Mozilla Firefox or Safari), and may be used when the web browser instances 202 and 210 do not have a parent-child relationship. For completeness, we note that the methods may be used when the web browser instances 202 and 210 are implemented with web browsers from the same vendor, and may be used when the web browser instances 202 and 210 do have a parent-child relationship.

The following example highlights some of the benefits of the methods described herein. The user 104 may open the service provider web application 204 sourced from the service provider server 114 (at "sp.com") in an Internet Explorer web browser instance 202. The user 104 may then open the web application 212 of approved partner X (who is approved by the service provider and therefore whose domain appears in the ACL stored in the database 224) sourced from the server 116 (at "x.com") in an unrelated new window of the Internet Explorer web browser. The user 104 may then open a web application of another approved partner Y (who is approved by the service provider and therefore whose domain appears in the ACL stored in the database 224) sourced from the server 118 (at "y.com") in a new window of the Firefox web browser. With the publish-subscribe mash-up infrastructure described herein, all of these web applications will be able to communicate client-side, as required by the mash-up, using the publish-subscribe methodology described herein. At the same time, the user 104 may open a web application of unapproved partner Z (who is not approved by the service provider and therefore whose domain does not appear in the ACL stored in the database 224) sourced from the server 120 (at "z.com"). The web application of unapproved partner Z will be blocked from participating in the client-side signaling with the server provider web application 204 (and with the other web applications of partners X and Y). Such control over the communication between web applications of these web browser instances for mash-ups at a device is not possible with the prior art mash-up systems such as the OpenAjax hub system.

The methods described herein have strengths associated with a hybrid service provider client application, that is, a service provider client application which has web components (such as the service provider web application 204) combined with native components (such as the publish-subscribe daemon application 218 and the publish-subscribe browser plugins 208 and 216). Some existing sophisticated web application service provider client applications have a hybrid nature including native client-side components, in order to implement features of the service provider client application which may be hard or impossible to provide in a pure web architecture without native enhancements. For these service provider client applications, it would be simple and beneficial to enhance the service provider client application by inclusion of the publish-subscribe signaling infrastructure described herein, to thereby provide a secure method for signaling between web applications for mash-ups. In particular, it is beneficial to use the methods described herein, rather than a pure web mash-up architecture, since the methods described herein do not place restrictions on the types of web browser instances that can be used, e.g. unlike in a pure web mash-up architecture, in the methods described herein the web browser instances 202 and 210 may be implemented with web browsers from different vendors (e.g. Microsoft Internet Explorer and Mozilla Firefox or Safari), and the web browser instances 202 and 210 may have a relationship that is not a parent-child relationship.

Some prior art systems use server-side solutions to enable cross-domain web application signaling. These systems involve HTTP push technologies such as websocket or comet (long-polling). The methods described herein are superior to such server-side solutions in the following ways:

(i) Higher performance: the device 102 is not required to communicate with a server of the service provider (except for the first domain authorization check, which is then stored in the cache 220);

(ii) Lower delay: with no communication over the network 112 being required, the methods can be performed faster;

(iii) Lower cost: little or no server processing capacity needs to be provisioned to perform the methods; and (iv) the methods work in an offline mode, e.g. when the device 102 is not connected to the network 112. In contrast, server-side solutions are cut off from the server when the device is offline and hence cease to work until the connection to the network 112 is restored.

An example of how the methods described herein may be used for a web mash-up when the service provider is an Internet communication service provider (such as Skype™) is given here. The Internet communication service provider client application is installed on the device 102. The user 104 is an authorized user of the Internet communication service provider and executes the service provider web application 204 at the device 102. The user 104 simultaneously executes another web browser instance 210 to display a web page of a partner, e.g. an airline such as continental.com. Continental.com is included in the list of partners approved by the service provider, such that the web application 212 for continental.com will be allowed to communicate with the service provider web application 204 at the device 102. The methods described herein allow the user 104 to use the Internet Communication service to get help from a customer support on the continental.com website. On the continental.com website, there would be a "chat with customer representative" widget, through which the user 104 can get help on the issue at hand. If the user 104 activates the "chat with customer representative" widget, the chat widget would communicate client-side with the service provider web application 204 using the publish-subscribe signaling described herein. This is allowed since the continental.com domain is included in the service provider's list of approved partners. If continental.com was not included in the list of partners who are approved by the service provider then the continental.com web application 212 would not be able to communicate with the Internet communication service provider web application 204. The Internet communication service provider web application 204 signals to the native backend of the Internet communication service provider client application installed at the device 102, and from there the chat messages goes to the customer representative over the Internet 112 using the Internet communication system (e.g. Skype™) associated with the Internet communication service provider. In this arrangement, the partner (continental.com) does not need to invest in, or develop, any server infrastructure for implementing the chat over the Internet communication system. All the partner is required to do is include a piece of Javascript in its web application 212 for the chat widget that is programmed to talk over the publish-subscribe signaling scheme to Internet communication service provider client application.

In the examples described above, the partner web application 212 sends a subscribe request to the publish-subscribe daemon application 218 such that it can receive published data on a channel indicated in the subscribe request. The partner web application 212 may additionally, or alternatively, invoke a publish request message for publishing data on a particular channel, and deliver the publish request message to the publish-subscribe daemon application 218 in the same way as described above for the subscribe request message invoked by the partner web application 212. The publish request message may undergo a domain check corresponding to that performed for the subscribe request as described above. In particular, the publish-subscribe daemon application 218 may determine whether the partner web application 212 which sent the publish request message is allowed to communicate using the publish operation by checking that the domain of the partner web application 212 is included in the ACL (stored at the database 224 or in the cache memory 220). Based on the determination, the publish-subscribe daemon application 218 then either allows or prevents communication from the partner web application 212 using the publish request. The publish request may, for example, be for sending data to the service provider web application 204 using the publish-subscribe signaling scheme, wherein the service provider web application 204 can act as a subscriber on the particular channel for receiving the data published by the partner web application 212.

The components 202 to 218 shown in FIG. 2 are preferably implemented in software for execution by the CPU 106 on the device 102. As an example, the publish-subscribe daemon application 218 may be provided by way of a computer program product embodied on a non-transient computer-readable medium which is configured so as when executed on the CPU 106 of the device 102 to perform the method steps described herein in relation to the publish-subscribe daemon application 218 and shown in FIG. 3.

The device 102 may be of any suitable type on which the web applications described herein can be implemented. For example, the device 102 may be a mobile phone, a personal computer, a laptop, a television or any other device which can store and execute the applications described herein and can also connect to, and communicate with, the network 112.

The ACL, that is the list of partners who are approved by the service provider, may be arranged as any set of indications of the partners which are approved by the service provider. No specific structure is required for the list, it is just necessary for the publish-subscribe daemon application 218 to be able to determine from the list whether partner web applications are associated with entries in the list, to thereby determine whether the partner web applications are allowed to communicate with the service provider web application 204 at the device 102.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of controlling communication between a service provider web application executing in a first web browser instance implemented on a device platform of a device and a partner web application executing in a second web browser instance implemented on the device platform of the device, the method comprising:
   receiving, at a control module implemented at the device, a signal from the partner web application for initiating communication between the partner web application and the service provider web application, said control module being:
      provided by the service provider;
      installed on the device; and
      implemented using technology that is native to the device platform;
   determining, at the control module, whether the partner web application is approved for communication with the service provider web application; and
   responsive to determining that the partner web application is approved for communication with the service provider web application allowing communication between the partner web application and the service provider web application.

2. The method of claim 1 further comprising:
   responsive to determining that the partner web application is not approved for communication with the service provider web application, preventing communication between the partner web application and the service provider web application.

3. The method of claim 1 wherein the first and second web browser instances each include a respective browser plugin that is configured to enable communication between the respective web browser instance and the control module.

4. The method of claim 1 wherein the service provider web application and the partner web application implement respective application programming interfaces for communicating with each other via the control module.

5. The method of claim 4 wherein the application programming interfaces are downloaded at the control module from a server of the service provider.

6. The method of claim 1 wherein the determining is based on a list of partners approved by the service provider stored at a server of the service provider, said determining further comprising communicating with the server of the service provider over a network to access the list of partners approved by the service provider.

7. The method of claim 1 wherein the determining is based on a list of partners approved by the service provider downloaded from a server of the service provider and stored in a memory of the device, said determining further comprising accessing the list of partners approved by the service provider from the memory of the device.

8. The method of claim 1 wherein the communication between the service provider web application and the partner web application uses a publish-subscribe signaling scheme.

9. The method of claim 8 wherein the signal received at the control module from the partner web application is a subscribe request of the publish-subscribe signaling scheme.

10. The method of claim 8 wherein the signal received at the control module from the partner web application is a publish request of the publish-subscribe signaling scheme.

11. The method of claim 1 wherein the first and second web browser instances are implemented with web browsers from different vendors.

12. The method of claim 1 wherein the first and second web browser instances do not have a parent-child relationship.

13. The method of claim 7 wherein said determining comprises comparing a domain associated with the partner web application with the entries of the list of partners approved by the service provider.

14. The method of claim 1 wherein the service provider is an Internet communication service provider and the partner web application utilizes the communication between the partner web application and the service provider web application to communicate over the internet.

15. The method of claim 1 wherein the service provider web application and the control module are parts of a hybrid service provider client application downloaded to the device from a server of the service provider.

16. A method for controlling communication between a service provider web application executing in a first web browser instance implemented on a device platform of a device and a partner web application executing in a second web browser instance implemented on the device platform of the device, the method comprising:
  implementing, at the device, a control module that is provided by the service provider and uses technology native to the device platform;
  receiving, at the control module, a signal from the partner web application for initiating communication between the partner web application and the service provider web application;
  determining, at the control module, whether the partner web application is approved for communication with the service provider web application; and
  responsive to determining that the partner web application is approved for communication with the service provider web application, allowing communication to proceed between the partner web application and the service provider web application.

17. A device comprising: processing hardware and a control module executable via the processing hardware that is:
  configured to control communication between a service provider web application executing in a first web browser instance implemented on a device platform of the device and a partner web application executing in a second web browser instance implemented on the device platform of the device;
  provided by the service provider;
  implemented using technology native to the device platform; and
  configured to perform operations comprising:
    receiving a signal from the partner web application for initiating communication between the partner web application and the service provider web application;
    determining whether the partner web application is approved for communication with the service provider web application; and
    responsive to determining that the partner web application is approved for communication with the service provider web application, allowing communication between the partner web application and the service provider web application.

18. The device of claim 17 further comprising responsive to determining that the partner web application is not approved for communication with the service provider web application, preventing communication between the partner web application and the service provider web application.

19. The device of claim 17 wherein the first and second web browser instances each include a browser plugin configured to communicate between the respective web browser instance and the control module.

20. The device of claim 17 further comprising implementing respective application programming interfaces in the service provider web application and the partner web application for communication between the service provider web application and the partner web application via the control module.

21. The device of claim 17 further comprising a memory configured to store a list of partners approved by the service provider that is downloaded from a server of the service provider.

22. A system comprising:
  a device configured to:
    execute a service provider web application in a first web browser instance implemented on a device platform of the device;
    execute a partner web application in a second web browser instance implemented on the device platform of the device; and
    implement a control module installed on the device that is provided by the service provider, uses technology that is native to the device platform, and is configured to perform operations comprising:
      receiving a signal from the partner web application for initiating communication between the partner web application and the service provider web application;
      determining whether the partner web application is approved for communication with the service provider web application; and
      responsive to determining that the partner web application is approved for communication with the service provider web application, allowing communication between the partner web application and the service provider web application; and
  a memory for storing a list of partners approved by the service provider.

23. The system of claim 22 wherein the service provider web application and the control module are parts of a hybrid service provider client application downloaded to the device from a server of the service provider.

* * * * *